Patented Dec. 19, 1950

2,534,359

UNITED STATES PATENT OFFICE 2,534,359

PRESERVATION OF LATEX

Chester E. Linscott, Ridgewood, N. J., assignor to United States Rubber Company, New York, N. Y., a corporation of New Jersey No Drawing. Application September 11, 1948, Serial No. 48,931

8 Claims. (Cl. 260—820)

This invention relates to improvements in methods of preserving natural rubber latex and the products thereof.

Natural rubber latex is commonly preserved today with ammonia. It is also known to preserve latex with formaldehyde, but such formaldehyde-preserved latex thickens rapidly with age, and in a few months becomes too thick for direct use in manufacturing processes. The solid rubber derived from formaldehyde-preserved latex, however, is much softer than the rubber derived from ammonia preserved latex, and this is desirable in many manufacturing processes. Rubber from ammonia-preserved latex gives a Mooney viscosity of around 115 to 160, and rubber from formaldehyde-preserved latex gives a Mooney viscosity of around 58 to 68, as measured by the Mooney shearing disc plastometer described by M. Mooney in Industrial and Engineering Chemistry, Anal. Ed. 6, 147 (1934). It has been suggested to preserve freshly tapped latex with formaldehyde and alkylated aryl sulfonates, which are well known surface-active dispersing agents, and to acidify alkali-preserved latex by removing or neutralizing the alkali and adding formaldehyde and an alkylated aryl sulfonate. This method has not proven successful for the preservation of fresh latex since the commercially available alkylated aryl sulfonates, such as isopropylnaphthalene sodium sulfonate, when used in feasible amounts, as from .1 to .5% based on the latex, with small amounts of formaldehyde, coagulate the latex.

The object of the present invention is to obtain a fluid formaldehyde-preserved latex which will remain fluid over a long period of time. The terms "natural rubber latex" and "latex" are used herein to designate the latex of the Hevea Brasiliensis tree.

According to the present invention, there is added to the fresh latex formaldehyde and a condensation product of formaldehyde with an alkali-metal salt of an aryl sulfonic acid, e. g., a condensation product of formaldehyde with sodium naphthalene sulfonate.

In carrying out the present invention, the amount of formaldehyde may be from .1 to 1% based on the latex. The formaldehyde reduces the pH of freshly tapped latex from about 7 to a range of 5.5 to 6.8 depending on the amount of formaldehyde added. The condensation product of formaldehyde with an alkali-metal salt of an aryl sulfonic acid does not appreciably change the range of pH imparted to the latex by the formaldehyde addition. The amount of such condensation product of formaldehyde with an alkali-metal salt of an aryl sulfonic acid is not critical and may range from .05 to 1%. If desired, a volatile secondary or tertiary amine, viz., di- or tri-methylamine, di- or tri-ethylamine, or morpholine may also be added to the latex. Such volatile secondary and tertiary amines do not react in the latex with the formaldehyde as do ammonia or primary amines. The amount of such secondary or tertiary amine should be such that the pH of the formaldehyde-treated latex is not generally raised to above 8.5. The amount of amine that may be added will thus depend on the amount of formaldehyde used and will in general be from .1 to 1% based on the latex, and the lower amount of formaldehyde added, the lower should be the amount of amine added. The sequence of addition of the formaldehyde, the condensation product of formaldehyde with an alkali-metal salt of an aryl sulfonic acid, and the volatile secondary or tertiary amine, if used, is not critical. The formaldehyde, however, should be added before enzyme activity begins in the latex. If the condensation product of formaldehyde with an alkali-metal salt of aryl sulfonic acid is added before, at the same time as, or within about an hour after, the formaldehyde, the viscosity of the resulting freshly preserved latex will be less than if the formaldehyde were added first and the condensation product added more than about an hour after the formaldehyde addition. In any case in which the condensation product is added, however, the viscosity of the freshly preserved latex will be considerably less than the viscosity of freshly preserved latex to which formaldehyde alone has been added as the preservative. If the latex used is to be shipped as normal latex, the entire amounts of preserving agents are added directly to the latex. If the latex is to be concentrated before shipment, only a part of one or more of the preserving agents need be added to the fresh latex, after which the latex may be concentrated, as by centrifuging, and further amounts of the preserving agents may be then added to the concentrated latex, as desired, before storage or shipping. In this manner, less preserving agents are used, since an aliquot portion of preserving agents initially added to the latex are removed in the serum in the centrifuging operation.

The following examples are illustrative of the present invention:

*Example I*

A fresh latex of 41.3% total solids was divided into six equal portions. To one portion was added .2% of formaldehyde. To the other five portions were added .2% of formaldehyde and .3% of a condensation product of formaldehyde with sodium naphthalene sulfonate, the condensation product being added to the respective portions at different times with respect to the formaldehyde addition. All percentages in the examples are by weight and are based on the latex. Viscosities were run on the latex portions so preserved, after the preservation of the last sample. Viscosity measurements in centipoises (cps.) were made at 31.5° C. and are set out below. When the .3% of condensation product of formaldehyde with sodium naphthalene sulfonate was added to the latex 15 minutes before the .2% of formaldehyde, the final viscosity of the latex was 6.68. When the condensation product was mixed with the formaldehyde, and the mixture added to the latex, the viscosity was 6.75. When the formaldehyde was added first, followed by the condensation product after 15 minutes' standing, the latex viscosity was 6.88. When the formaldehyde was added first, followed by the condensation product after 4 hours' standing, the latex viscosity was 7.21. When the formaldehyde was added first, followed by the condensation product after 20 hours' standing, the latex viscosity was 7.85. When formaldehyde alone was the preservative, the latex viscosity was 8.19.

When .1 to .5% of a commercial alkylated aryl sulfonate, viz., isopropylnaphthalene sodium sulfonate, was added to the fresh latex with .2% of formaldehyde, the latex samples to which the isopropylnaphthalene sodium sulfonate had been added at the same time as the formaldehyde all coagulated.

*Example II*

To a 39.2% total solids freshly tapped latex, .2% of formaldehyde was added. The viscosity at room temperature (about 30° C.) was 7.9 cps. To another sample of the same latex was added .2% of formaldehyde admixed with .08% of a condensation product of formaldehyde with sodium naphthalene sulfonate, giving a viscosity at room temperature of 4.6 cps. To a third sample of the same latex was added .2% of formaldehyde followed by .08% of a condensation product of formaldehyde with sodium naphthalene sulfonate, giving a viscosity at room temperature of 5.4 cps.

*Example III*

To a sample of 38.4% total solids freshly tapped latex was added .2% of morpholine, followed after a 10-minute interval with .3% of formaldehyde. The pH dropped to 6.52 in six hours, at which time the latex was centrifuged, giving a 63.8% total solids cream. At the time of shipment nine hours later, .2% more of morpholine and .2% more of formaldehyde were added to the latex, giving a pH of 6.78. The viscosity of the latex at the time of shipment from the plantations to the United States was 28 cps. at room temperature (about 30° C.). A second similar sample was prepared but, after a centrifuging, .5% of a condensation product of formaldehyde was sodium naphthalene sulfonate was added with an additional .2% of morpholine and .2% of formaldehyde. The total solids of the centrifuged latex was 62.2%, and the pH was 6.84. The viscosity at the time of shipment was 29 cps. at room temperature (about 30° C). After 10 months from the time of shipment from the plantations, analysis in the United States showed no appreciable change in the total solids and pH of the two latices. The viscosity of the latex without the condensation product of formaldehyde with sodium naphthalene sulfonate, was 58 cps., at 20° C., and the viscosity of the sample containing the condensation product was 60 cps. at 20° C., showing similar slight viscosity changes in the two latices. Latex preserved with similar amounts of formaldehyde alone, i. e. without the morpholine or condensation product, would show a viscosity of around 200 cps. at 20° C. in this time. However, after 28 months from the time of shipment from the plantations, the latex which was preserved with the addition of the condensation product of formaldehyde with sodium naphthalene sulfonate was still fluid and showed a viscosity of 73 cps. at 20° C., whereas the latex to which no condensation product of formaldehyde with naphthalene sulfonic acid had been added was too viscous to test and partially coagulated. The morpholine in addition to the formaldehyde gives a better preserved latex than formaldehyde alone, for an appreciably long period of time, and this is the subject matter of a separate application. However, it is shown in this example that the further addition of the condensation product of formaldehyde with an alkali metal salt of an aryl sulfonic acid, to the latex preserved with morpholine and formaldehyde, gives a still further improvement, as shown above.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of preserving natural Hevea rubber latex which comprises adding to fresh natural Hevea rubber latex 0.1 to 1% of formaldehyde based on the latex, 0.05 to 1% based on the latex of a condensation product of formaldehyde with an alkali-metal salt of an aryl sulfonic acid, and 0.1 to 1% based on the latex of an amine of the group consisting of di- and tri-methylamines, di- and tri-ethylamines and morpholine.

2. The method of preserving natural Hevea rubber latex which comprises adding to fresh natural Hevea rubber latex 0.1 to 1% of formaldehyde based on the latex, and 0.05 to 1% based on the latex of a condensation product of formaldehyde with sodium naphthalene sulfonate, and 0.1 to 1% of morpholine based on the latex.

3. The method of preserving natural Hevea rubber latex which comprises adding to fresh natural Hevea rubber latex 0.1 to 1% of formaldehyde based on the latex, 0.05 to 1% based on the latex of a condensation product of formaldehyde with sodium naphthalene sulfonate, and 0.1 to 1% based on the latex of an amine of the group consisting of di- and tri-methylamines, di- and tri-ethylamines and morpholine.

4. The method of preserving natural Hevea rubber latex which comprises adding to fresh natural Hevea rubber latex 0.1 to 1% of formaldehyde based on the latex, 0.05 to 1% based on the latex of a condensation product of formaldehyde with an alkali-metal salt of an aryl sulfonic acid, and 0.1 to 1% of morpholine based on the latex.

5. A natural Hevea rubber latex containing .01 to 1% of formaldehyde, 0.1 to 1% of morpholine and 0.05 to 1% of a condensation product of formaldehyde with an alkali-metal salt of an aryl sulfonic acid, said percentages being based on the latex.

6. A natural Hevea rubber latex containing .01 to 1% of formaldehyde, 0.1 to 1% of an amine of the group consisting of di- and tri-methylamines, di- and tri-ethylamines and morpholine, and 0.05 to 1% of a condensation product of formaldehyde with an alkali-metal salt of an aryl sulfonic acid, said percentages being based on the latex.

7. A natural Hevea rubber latex containing .01 to 1% of formaldehyde, 0.1 to 1% of morpholine and 0.05 to 1% of a condensation product of formaldehyde with sodium naphthalene sulfonate, said percentages being based on the latex.

8. A natural Hevea rubber latex containing .01 to 1% of formaldehyde, 0.1 to 1% of an amine of the group consisting of di- and tri-methylamines, di- and tri-ethylamines and morpholine, and 0.05 to 1% of a condensation product of formaldehyde with sodium naphthalene sulfonate, said percentages being based on the latex.

CHESTER E. LINSCOTT.

REFERENCES CITED

The following references are of record in the file of this patent:

UNITED STATES PATENTS

| Number | Name | Date |
| --- | --- | --- |
| 1,699,369 | McGavack | Jan. 15, 1929 |
| 1,838,826 | Gunther et al. | Dec. 29, 1931 |
| 1,872,161 | McGavack | Aug. 16, 1932 |